(12) United States Patent
Horiguchi et al.

(10) Patent No.: US 7,061,862 B2
(45) Date of Patent: Jun. 13, 2006

(54) INTER-NETWORK RELAY SYSTEM AND METHOD

(75) Inventors: Akihiro Horiguchi, Tokyo (JP); Takahiro Murono, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 979 days.

(21) Appl. No.: 10/011,479

(22) Filed: Dec. 11, 2001

(65) Prior Publication Data

US 2002/0071387 A1 Jun. 13, 2002

(30) Foreign Application Priority Data

Dec. 11, 2000 (JP) .......................... P2000-375809

(51) Int. Cl.
*H04L 12/28* (2006.01)
*H04L 12/56* (2006.01)

(52) U.S. Cl. .................... 370/230; 370/468; 370/412

(58) Field of Classification Search ..................... None
See application file for complete search history.

(56) References Cited

U.S. PATENT DOCUMENTS

| | | | | |
|---|---|---|---|---|
| 5,889,763 A | * | 3/1999 | Boland et al. | 370/235 |
| 6,122,673 A | * | 9/2000 | Basak et al. | 709/238 |
| 6,324,165 B1 | * | 11/2001 | Fan et al. | 370/232 |
| 6,539,024 B1 | * | 3/2003 | Janoska et al. | 370/412 |
| 6,628,609 B1 | * | 9/2003 | Chapman et al. | 370/229 |
| 6,633,540 B1 | * | 10/2003 | Raisanen et al. | 370/230.1 |
| 6,711,130 B1 | * | 3/2004 | Sato | 370/230.1 |
| 6,751,194 B1 | * | 6/2004 | Ueno | 370/235 |

OTHER PUBLICATIONS

J. Heinanen et al., Request for Comments (RFC) 2597, Network Working Group, Jun. 1999.

* cited by examiner

*Primary Examiner*—Chau Nguyen
*Assistant Examiner*—Jordan Hamann
(74) *Attorney, Agent, or Firm*—Finnegan, Henderson, Farabow, Garrett & Dunner, L.L.P.

(57) ABSTRACT

An inter-network relay unit is provided that is capable of simultaneously achieving guaranteed minimum bandwidth and priority control (including relay priority, discard priority, delay priority, etc.). A rate controller outputs relatively high priority packets from priority queues as guaranteed traffic based on guaranteed bandwidth for each link. Relatively low priority packets left in the priority queues are marked for preferential discard and output as best-effort traffic by an aging timer. When an output port is congested, an output queue portion discards only the marked packets. Thus, traffic having a plurality of relay priorities can use the guaranteed minimum bandwidth effectively and the guaranteed minimum bandwidth can be secured, irrespective of change in traffic volume for each relay priority level.

12 Claims, 17 Drawing Sheets

INTER-NETWORK RELAY SYSTEM AND METHOD

CROSS-REFERENCE TO RELATED APPLICATIONS

This application claims the benefit of priority from Japanese Patent Application No. 2000-375809, filed on Dec. 11, 2000; the entire contents of which are incorporated herein by reference.

FIELD OF THE INVENTION

The present invention relates to devices that transfer communication packets, such as transmission control protocol/internet protocol (TCP/IP) packets. The present invention further relates to devices that provide guaranteed bandwidth, priority control and scheduling of packet transfers.

BACKGROUND

With an increase in popularity of Internet communications, the Internet infrastructure has expanded significantly. Inter-network relay units, such as bridges and routers, have been used to couple different segments of the Internet infrastructure. Bridges perform packet transfer processes for each destination using a data link layer and routers do the same using a network layer. A network infrastructure configured from conventional relay units uses statistical multiplexing and is easy to access. However, such a network infrastructure does not enable end-to-end bandwidth guarantees.

In recent years, a virtual private network (VPN) has been devised that uses Internet technology. According to this concept, a user may construct a closed user group (CUG) on a public network to establish a private network. FIG. 16 illustrates an example of a conventional VPN 16000. In the VPN 16000, the user may transmit a packet to a destination through a core network 16010. Each packet is transmitted through the core network 16010 by a relay unit 16020 coupled to a multiple access line 16050, such as a trunk line. Each multiple access line 16050 may support multiple tunnels 16060, where each tunnel 16060 is a multiplexed communication link. The relay unit 16020 determines a destination relay unit 16030–16040 for the packet and selects a tunnel 16060 to route the packet through the selected tunnel 16060 to the destination relay unit 16030–16040 through the selected tunnel 16060.

In general, a VPN 16000 service provider may guarantee a minimum allocated bandwidth to the user. With guaranteed minimum bandwidth service, the user can contract to always have the guaranteed bandwidth available for their exclusive use. Therefore, the user can be guaranteed at least the minimum rate of communication between endpoints of the VPN without interruption, even when the public network is congested with other traffic. Furthermore, the user can use additional bandwidth when the public network is not congested with other traffic and additional bandwidth is available. However, VPN 16000 service providers have not made guaranteed minimum bandwidth service available using the Internet.

For example, a frame relay network may guarantee a bandwidth at a committed information rate (CIR), even when the frame relay network is congested. Each user of the frame relay network may contract for secure a guaranteed minimum bandwidth in the following manner. Initially, a CIR value corresponding to the guaranteed minimum bandwidth is set up for the user's access line at an entrance to the frame relay network. When a packet is received exceeding the CIR value, the packet is marked for preferential discard. The marked packet is preferentially discarded when the network is congested. According to this method, when the network is not congested and additional bandwidth is available, each packet marked for preferential discard can be relayed. Therefore, the contracting user can efficiently use any additional network bandwidth that is available.

In the VPN 16000, packets processed by different applications are transferred from access lines of one or more users. The priority of packets produced may vary significantly according to the application that produced the packets. For example, packets produced by applications used for e-mail or web access may have a relatively low priority, whereas packets produced by applications used for real time voice/video communication or a mission critical system may have a relatively high relay priority.

However, conventional minimum bandwidth guarantee methods, such as frame relay, do not consider the relay priority for individual packets when selecting packets to be marked for preferential discard. Consequently, the user's high priority packets, that should be relayed, may be discarded while the user's low priority packets are relayed through the network. Therefore, the user's guaranteed minimum bandwidth is not optimally allocated.

There are other guaranteed minimum bandwidth methods that do consider the relay priority of individual packets. However, in those methods a fixed amount of bandwidth is allocated for guaranteed traffic and best-effort traffic for each output link, such as each tunnel 16060. Therefore, packets may be discarded without consideration of their relay priority when the number of packets at a priority level directed to the output link exceeds the allocated bandwidth for that priority level. FIG. 17 illustrates an example of a conventional method for guaranteeing a minimum bandwidth based on relay priority. For example, a medium/high priority packet may be allocated with guaranteed traffic, such as committed data rate (CDR) traffic, and a low priority packet may be allocated with best-effort traffic to be marked for preferential discard. In this example, high priority packets may be discarded when the traffic exceeds the CDR, even though the volume of low priority traffic is less than the bandwidth allocated for low priority traffic.

Another packet transfer scheduling method uses a token bucket to police (i.e., check rate conformance) and shape traffic based on the guaranteed minimum bandwidth. In the token bucket method, each token represents a data transfer unit such as a bit or byte. Each bucket fills with tokens at a rate based on the guaranteed minimum bandwidth, and approval to transfer packets is determined by the quantity of tokens in the bucket.

When the quantity of tokens in the bucket exceeds a packet size, approval is given to transfer the packet and a number of tokens equivalent to the packet size are deducted from the quantity of tokens in the bucket. Otherwise, when the quantity of tokens is less than the packet size, approval to transfer the packet may be withheld until the quantity of tokens in the bucket exceeds the packet size. However, even when the quantity of tokens in the bucket is insufficient, the packet may be transferred after attaching a mark indicating traffic in excess of the guaranteed minimum bandwidth. The supply of packets to be transferred may be limited; therefore the supply of tokens to the bucket may be stopped when the quantity of tokens reaches this limited value because the traffic rate may be less than the minimum guaranteed bandwidth for a long period of time, such as an hour.

In the token bucket scheduling method, it is possible to approve the transfer of a traffic burst within the range of token bucket capacity based on the guaranteed minimum bandwidth. A system for realizing this burst transfer would comprise counter logic for filling a token bucket at a defined rate, a token counter for each bucket provided for each buffer or queue, and computational logic for deducting tokens from the counter of each bucket according to the size of each transferred packet, etc.

However, in such a system, smaller token units require faster computational logic for deducting tokens from the counter of each bucket. Further, when there are a plurality of queues, a mechanism for supplying tokens at a rate based on each guaranteed minimum bandwidth and a mechanism for counting tokens for each queue are required. Such a system would be complicated and large in size.

For each user, relay priority is a matter of relative preference. Accordingly, in order to use a guaranteed bandwidth efficiently, it is desirable that packets with low relay priority should be transferred up to the guaranteed minimum bandwidth unless there is another packet having higher relay priority at the same time. Furthermore, packets having higher relay priority should be preferentially allocated as traffic within the guaranteed minimum bandwidth without being affected by another packet having lower relay priority. If packets having high relay priority are received in excess of the guaranteed minimum bandwidth, the high relay priority packets should be treated as a best-effort traffic and may be marked for preferential discard, even though the relay priority is high.

SUMMARY OF THE INVENTION

To address the above and other limitations of known systems, methods and systems are provided to enable VPN service providers to provide a guaranteed minimum bandwidth service, using the Internet. Rather than requiring a dedicated network, such as a frame relay network, such methods and systems may be used with non-proprietary hardware, such as devices that support the transmission control protocol/internet protocol (TCP/IP).

In accordance with an embodiment of the present invention, an inter-network relay unit is provided comprising a first queue configured to store received packets according to their respective attributes; a rate controller configured to generate timing for outputting each packet stored in the first queue at a predetermined rate; a timer configured to measure how long each packet is stored in the first queue; a marker configured to identify packets stored in the first queue longer than a predetermined time limit; and a first server configured to output packets according to the timing as traffic in a guaranteed bandwidth, and to output identified packets as traffic outside the guaranteed bandwidth.

In accordance with another embodiment of the present invention, an inter-network relay unit is provided comprising a plurality of priority queues configured to store received packets according to their respective priorities; a rate controller configured to generate timing for outputting each packet stored in the plurality of priority queues at a predetermined rate; and a server configured to output packets from the plurality of priority queues, according to the timing and in order of the respective priorities of the packets.

In accordance with still another embodiment of the present invention, an inter-network relay unit is provided comprising a plurality of queues configured to store received packets according to their respective attributes, each queue having a preset first threshold value of queue length, a preset second threshold value of queue length, and a total length; means for managing queues with lengths in excess of their respective first threshold values; and means for discarding one or more of the packets stored in the managed queues according to excess length when the total length of the managed queue used exceeds the second threshold value.

In accordance with yet another embodiment of the present invention, an inter-network relay unit is provided comprising a plurality of queues configured to store received packets according to the respective logical lines via which the packets are received, wherein a plurality of queues are coupled to each logical line and each queue has a preset first threshold value of queue length, a preset second threshold value of queue length, and a total length; means for managing queues with lengths in excess of their respective first threshold values; and means for discarding one or more of the packets stored in the managed queues and to be transferred via a logical line where the first threshold value is exceeded according to excess length, when the total used length exceeds the second threshold value.

In accordance with another embodiment of the present invention, an inter-network relay unit is provided comprising a plurality of queues configured to store received packets according to their respective logical lines via which the packets are transferred, wherein a plurality of queues are coupled to each logical line; a rate controller configured to generate timing for outputting packets stored in each queue at a predetermined rate for each logical line; a timer configured to measure how long each packet is stored in the queue; a marker configured to identify packets stored in the queue longer than a predetermined time limit; a plurality of first servers, each configured to output packets from each queue, according to the timing as traffic in a guaranteed bandwidth, and to output identified packets as traffic outside the guaranteed bandwidth; and a second server configured to output packets identified as traffic outside the guaranteed bandwidth by the first servers, using unused bandwidth from the guaranteed bandwidth on any of the logical lines, when bandwidth currently used for the logical line is less than bandwidth allocated for the logical line.

In accordance with still another embodiment of the invention, an inter-network relay unit comprising a plurality of first queues, wherein a plurality of queues are coupled to each logical line, configured to store identification information on each received packets according to their respective logical lines via which the packets are received, wherein the logical lines are grouped; a memory configured to store contents of the packets, in which each group has a preset memory size; a rate controller configured to generate timing for outputting packets, wherein first information is stored in the first queue at a predetermined rate for each logical line; a timer configured to measure how long first information for each packet is stored in the plurality of first queues; a marker configured to identify packets having first information stored in the plurality of first queues longer than a predetermined time limit; and a plurality of first servers each configured to output from each first queue first information for each packet according to the timing and the identification as traffic in a guaranteed bandwidth, and to output first information for identified packets as traffic outside the guaranteed bandwidth.

In accordance with an embodiment of the present invention, a transfer scheduling method in an inter-network relay unit is provided, comprising identifying attributes of received packets; storing the received packets in a plurality of queues according to their respective identified attributes; generating timing for outputting each packet stored in the queue at a predetermined rate; measuring how long each packet is stored in the queue; identifying packets stored in the queue longer than a predetermined time limit; and outputting packets from the queue according to the timing as traffic in a guaranteed bandwidth, and outputting identified packets as traffic outside the guaranteed bandwidth.

In accordance with another embodiment of the present invention, a transfer scheduling method in an inter-network relay unit is provided, comprising outputting a first packet from a queue; generating entries in a time table at a predetermined interval; calculating a position in the time table corresponding to when a second packet is outputted, the second packet which is outputted after the first packet, as a relative position from a position corresponding to when the first packet is outputted based on the length of the first packet and on a guaranteed bandwidth value predetermined for each queue; registering the second packet in the entry at the calculated position; determining whether the second packet is registered or not at the predetermined interval; and allowing the second packet to be outputted when the second packet is determined to be registered.

In accordance with still another embodiment of the present invention, a transfer scheduling method in an inter-network relay unit is provided, comprising storing a packet in a queue; registering an arrival time of the packet with an entry, each of which is linked another entry registered just before the registering; calculating a threshold value of arrival time of each stored packet based on a current time and a preset upper limit of being stored in the queue; comparing each registered arrival time with the threshold value at a predetermined interval; and recognizing every packet linked before a packet, of which arrival time is later than the threshold value, to be over the upper limit.

In accordance with yet another embodiment of the present invention, a transfer scheduling method in an inter-network relay unit is provided, comprising storing packets in a plurality of priority queues according to their respective priorities; generating timing for outputting each packet stored in the priority queues at a predetermined rate; and outputting packets from the priority queues according to the timing and in order of the priority of the packets.

In accordance with another embodiment of the present invention, a transfer scheduling method in an inter-network relay unit is provided, comprising setting a first threshold value of queue length for each queue; setting a second threshold value of queue length for a total length of all queues; storing packets in a plurality of queues according to their respective attributes; detecting queues having a used length in excess of their respective first threshold values; detecting an excess of the total length over the second threshold value; selecting the packets from one or more of the detected queues; and discarding the selected packets according to their several excess lengths.

BRIEF DESCRIPTION OF THE DRAWINGS

The accompanying drawings, which are incorporated in and constitute part of this specification, illustrate various embodiments and/or features of the invention and together with the description, serve to explain the principles of the invention. In the drawings.

DETAILED DESCRIPTION

Reference will now be made in detail to the exemplary embodiments of the invention, examples of which are illustrated in the accompanying drawings. Hereinafter, the term "packet" is used for convenience in the explanation. However, the invention is not restricted in applicability to packet data itself, but may also be applicable to attribute information related to each packet, such as, for example, a message including pointer information indicating an address of a storage buffer area and a packet length.

Figure 1:
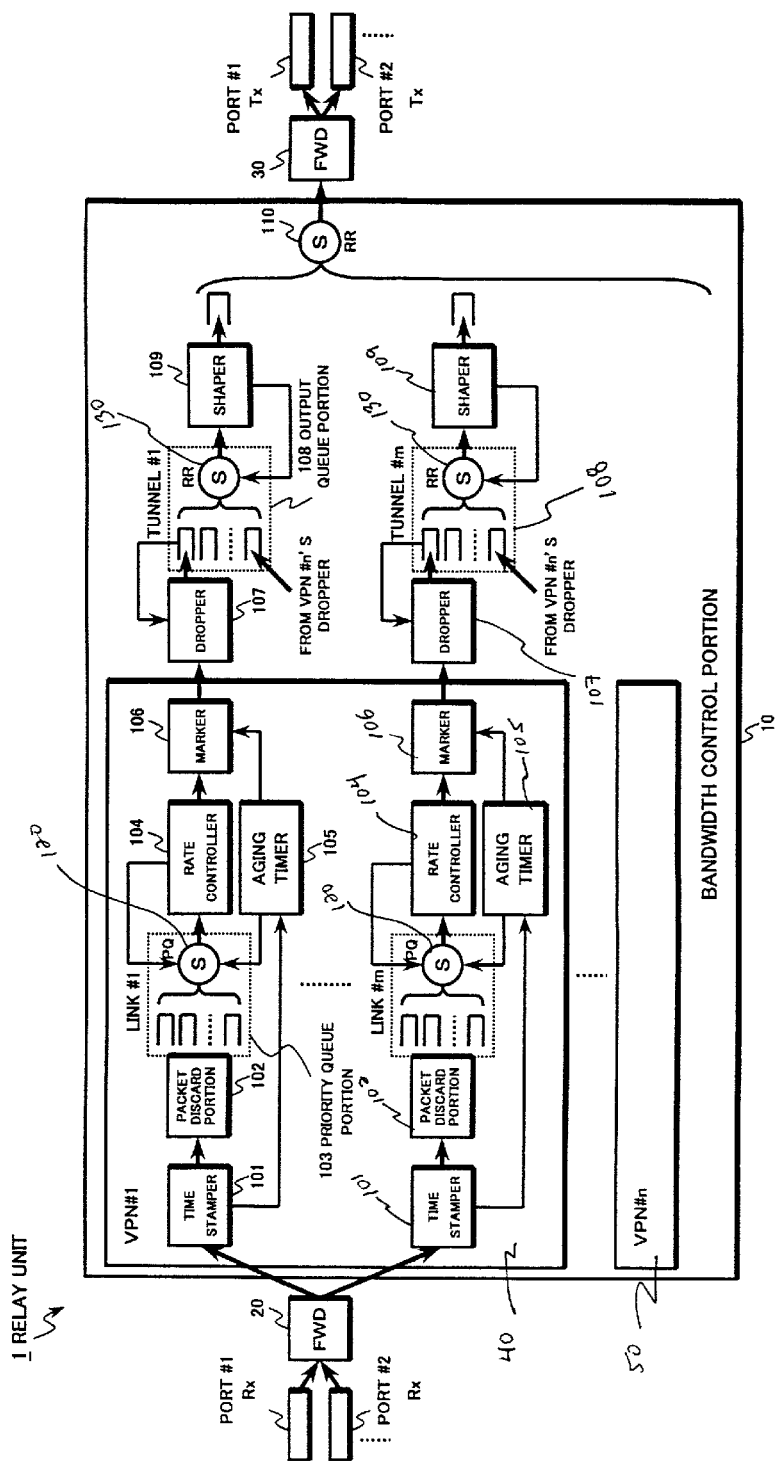
FIG. 1 is a block diagram of an exemplary configuration for a relay unit in which methods and systems consistent with the present invention may be implemented.

FIG. 1 is a block diagram of an exemplary configuration for a relay unit 1 such as a virtual private network (VPN) router, in accordance with methods and systems consistent with the present invention. The relay unit 1 includes a bandwidth control portion 10 for scheduling packet transfer based on each relay priority, a first packet forwarder (FWD) 20 for identifying a flow based on information stored in a header portion of each packet received from each port, for assigning a flow identifier and a relay priority, and for requesting the relay of the inputted packet to the bandwidth control portion 10, and a second FWD 30 for changing contents or converting formats of data scheduled to be transferred by the bandwidth control portion 10.

The bandwidth control portion 10 can support a plurality of VPNs (40, 50), each of which has a plurality of links. The bandwidth control portion 10 includes a time stamper 101, a packet discard portion 102, a priority queue portion 103, a rate controller 104 an aging timer 105, a marker 106, a dropper 107, an output queue portion 108, and a shaper 109. The relay unit 1 may include a plurality of processing portions, which are equivalent to each other and correspond to each link. However, although it is necessary to control each priority queue and output queue for each link and tunnel, some links and tunnels may not require all of the processing portions.

The time stamper 101 assigns an arrival time to each packet received from the FWD 20. If the number of packets in a priority queue portion 103 exceeds a preset threshold value for the queue length for each link and a total length exceeds a threshold value of queue length preset for each VPN 16000, then a packet discard portion 102 selects a queue from a list of queues that exceed the threshold value, and discards excess packets from the selected queue. The threshold value for the VPN 16000 is larger than the total length of all link queue length threshold values belonging to the VPN 16000.

The priority queue portion 103 is a queue system for each link, which has a plurality of independent queues for each relay priority and stores packets in applicable priority queues according to relay priority. A server 120 in the priority queue portion 103 determines an order for reading packets from the priority queue portion 103 based on the priority and age of the packets. The rate controller 104 and the aging timer 105 determine timing for reading packets.

The rate controller 104 generates packet readout timing so that those packets treated as a guaranteed traffic can be outputted at a data rate preset for each priority queue portion 103. The aging timer 105 calculates a stay time for each packet stored in the priority queue portion 103 based on a time stamp value assigned by the time stamper 101 and generates packet read-out timing for outputting the packet as best-effort traffic if the packet's age exceeds a designated stay time.

The marker 106 assigns a preferential discard mark to packets output from the priority queue portion 103 for the best-effort traffic. The dropper 107 detects congestion state based on, for example, a queue length indication from the output queue portion 108 and discards packets with preferential discard marking when congestion occurs. The output queue portion 108 has a plurality of queues for each tunnel that is a logical line in a network and stores packet strings belonging to the guaranteed traffic and the best-effort traffic according to the arrival sequence. The output queue portion 108 monitors queue lengths and notifies the dropper 107. These processes and the packet read process are executed by a server 130 in the output queue portion 108.

The shaper 109 generates packet read timing so that the packet is output from output queue portion 108 at a determined data rate conforming to the logical line bandwidth of each tunnel or the physical bandwidth of the output port. Server 110 reads the packet queues for each tunnel according to the read timing and passes the read packets to FWD 30. The packet read processes from the output queue portion 108 or from a server 110 can be executed according to a conventional "round robin" algorithm, for example.

Figure 2:
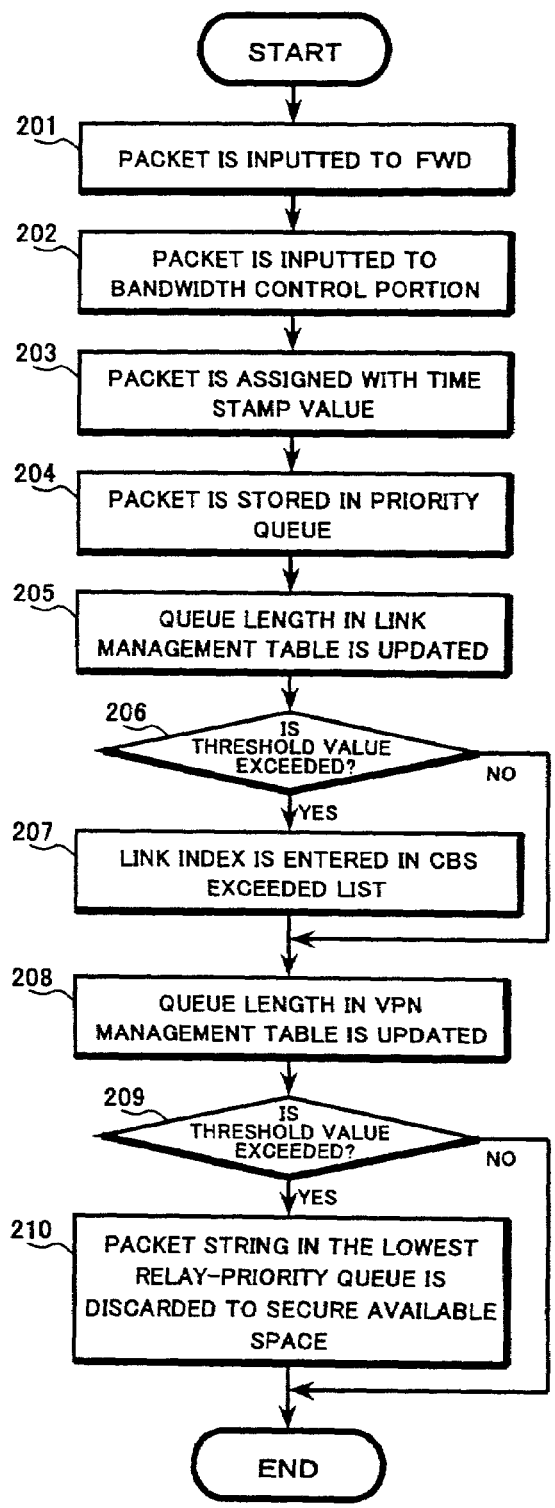
FIG. 2 is a flowchart of an exemplary technique for storing a packet in a priority queue in accordance with methods and systems consistent with the present invention.

Next, the process inside of relay unit 1 will be described. FIG. 2 is a flowchart of an exemplary technique for storing a packet in a priority queue in accordance with methods and systems consistent with the present invention. Packets are received from respective ports into the FWD 20 (step 201). A flow to which the received packet belongs may be identified by its header information. After being assigned information required for the packet transfer scheduling process, the packet is passed to the bandwidth control portion 10 (step 202). The information may include a VPN 16000 index, such as an identifier relative to VPN composed of a plurality of links, a link index such as a link's identifier, a tunnel index such as a tunnel's identifier, and a relay priority.

The time stamper 101 assigns a time stamp value showing an arrival time to each received packet (step 203). This arrival time becomes the reference for calculating stay time of the packet in the priority queue. The packet is stored in an applicable priority queue based on the VPN index, link index and relay priority (step 204). At this time, a queue length of a link management table 1031 is updated (step 205). Furthermore, the priority queue portion 103 for each link and a buffer resource for each link may be treated as common resources in the VPN 16000.

Figure 3:
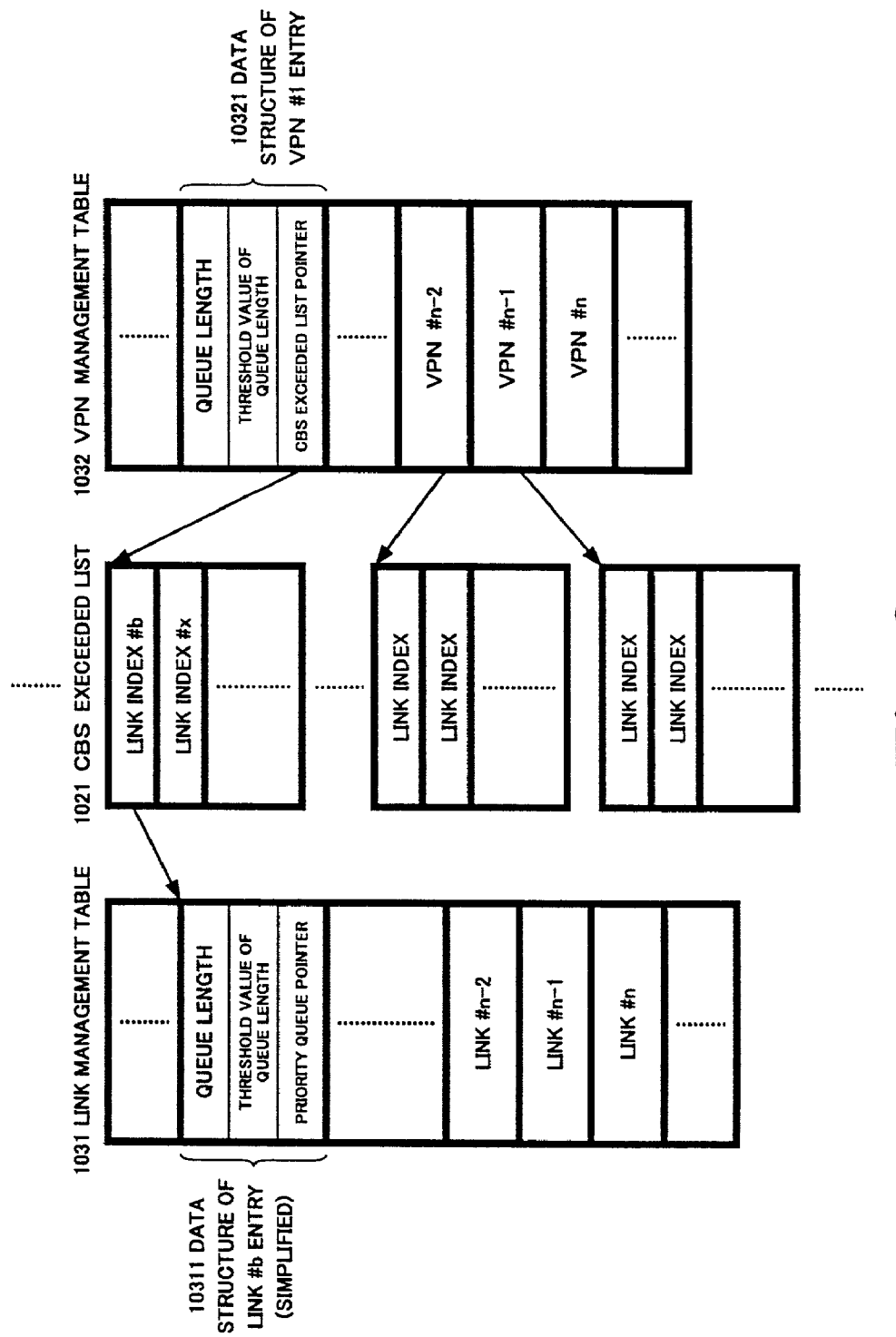
FIG. 3 is a diagram of an exemplary relationship between a link management table, a command burst size exceeded list, and a VPN management table in accordance with methods and systems consistent with the present invention.

FIG. 3 is a diagram of an exemplary relationship between a link management table 1031, a committed burst size (CBS) exceeded list 1021, and a VPN management table 1032 in accordance with methods and systems consistent with the present invention. The link management table 1031 may include a link entry structure 10311, comprising a link index, a total queue length, a threshold value of queue length that is specific to a link, such as, for example, a CBS exceeded value or a priority queue pointer. If the queue length exceeds the CBS exceeded value, the applicable link index is stored in a CBS exceeded list 1021. The VPN management table 1032 may include a VPN entry structure 10321, comprising a total queue length for all links belonging to the same VPN, threshold value of queue length specific to the VPN 16000, such as, for example, a total of threshold values of queue lengths for all links for the same VPN 16000 and a CBS exceeded list pointer showing the entry of the CBS exceeded list 1021.

When the packet is received in the priority queue portion 103, and allocated resources, such as the threshold value of queue length equivalent to the CBS of the link, are exceeded (step 206), a link index of the received packet may be entered in the CBS exceeded list 1021 (step 207). Furthermore, the queue length of the VPN management table 1032 may be updated (step 208).

As a result of receiving the packet, when the allocated common resource, as measured by the threshold value of queue length, of each VPN 16000 is exceeded (step 209), the packet discard portion 102 selects links for packet discard at random or in order of the sequence with the old entry from the CBS exceeded list. Furthermore, the packet discard portion 102 discards a packet string equivalent to a required length from the last queue that has the lowest relay priority from the selected links (step 210). Thus, a resource is secured and large losses of received packets may be avoided. Also, if the threshold value of queue length is not exceeded in step 206 or step 209, then the process is completed without discarding packets.

Figure 4:
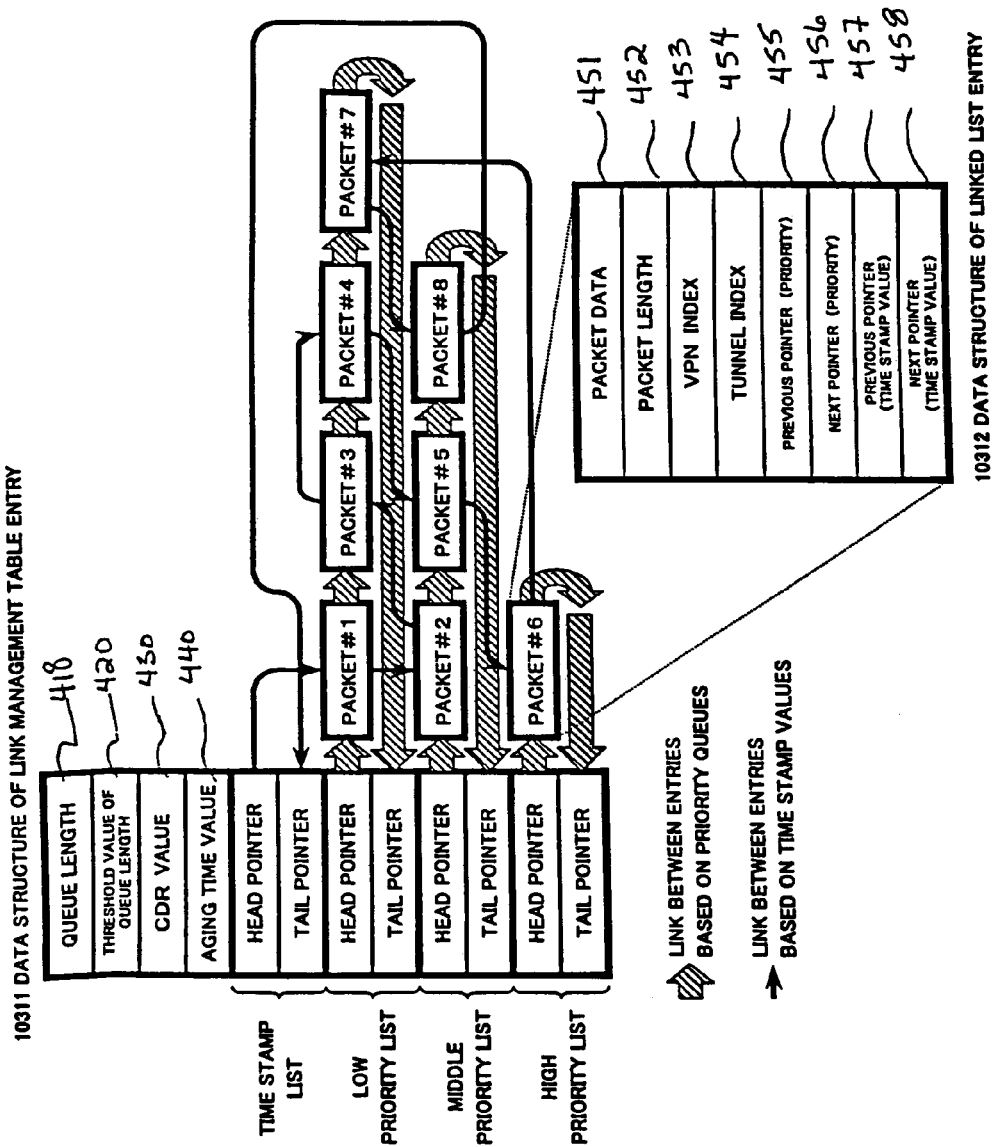
FIG. 4 is a diagram of an exemplary data structure for a link management table in accordance with methods and systems consistent with the present invention.

FIG. 4 is a diagram of an exemplary data structure 10311 for a link management table 1031 in accordance with methods and systems consistent with the present invention. The link table structure 10311 has fields for storing a value specific to each link, such as, for example, a total value of stored queue length 418, a threshold value of queue length 420, a CDR value of guaranteed bandwidth 430, and an aging time value 440 showing allowed time. The link table structure 10311 performs time series list management based on a time stamp value and priority of each packet. Further, an entry 10312 corresponding to each packet is assigned pointers showing before 455 and after 456 entry positions, in addition to various kinds of information (451–458), and then the list management is executed. For example, the CDR value 430 and the aging time value 440 may be preset for each link according to a contract.

The packet data field 451 of the entry 10312 may include a pointer to a buffer instead of to actual packet data. Further, the priority queue is structured so that packets are output from the highest priority queue and as long as there are packet entries in higher priority queues, no chance is given for low priority queues to output any packets.

Figure 5:
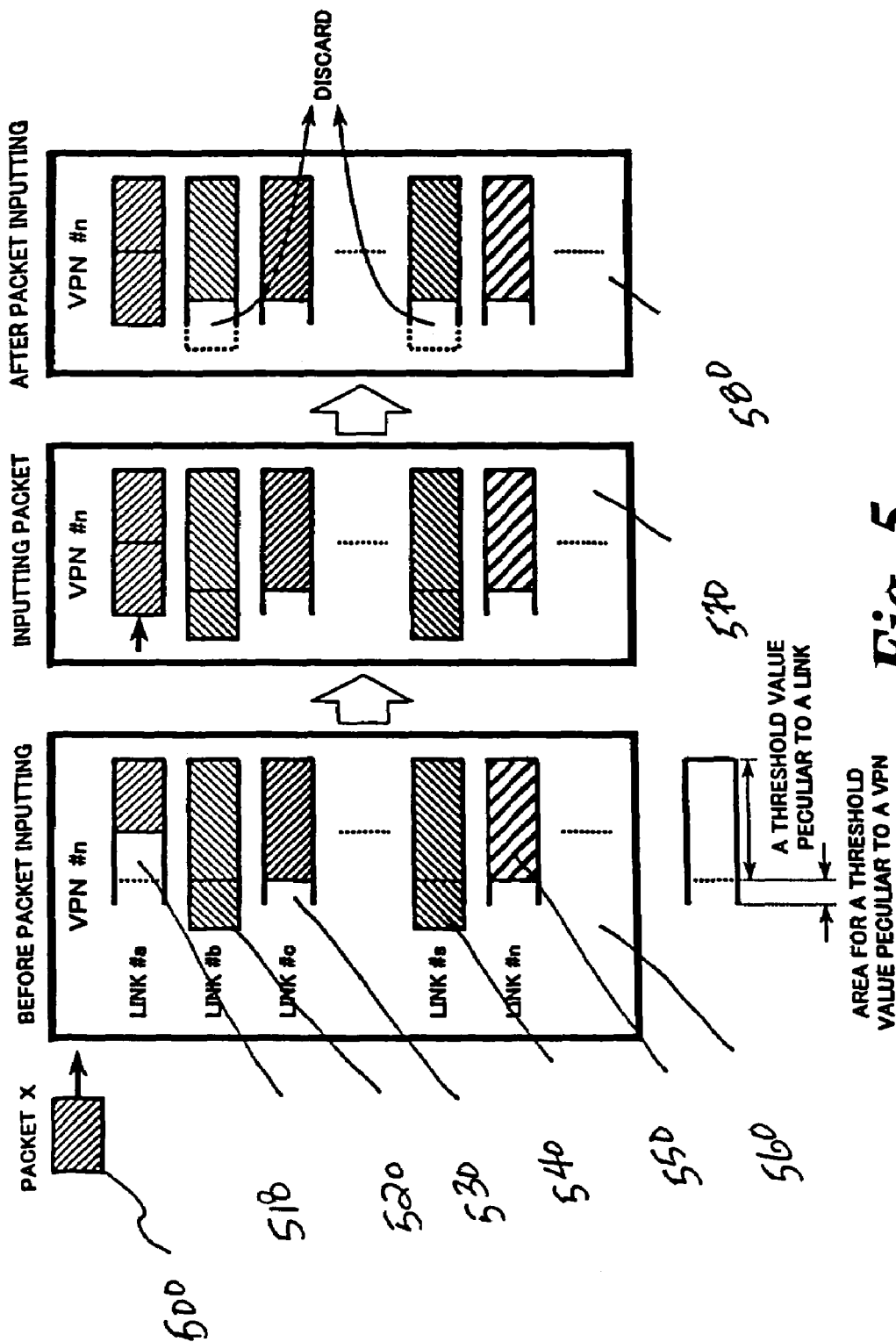
FIG. 5 is a diagram showing operation of an exemplary packet discard portion in accordance with methods and systems consistent with the present invention.

Next, the operational concept of the packet discard portion 102 will be described. FIG. 5 is a diagram showing operation of an exemplary packet discard portion 102 in accordance with methods and systems consistent with the present invention. For example, in an initial state 560 before receiving a packet X500, queue lengths stored in Link #b 520 and Link #s 540 exceeded threshold values specific to the links but a total value of queue lengths in all links for the VPN 16000 does not exceed the threshold value for the VPN 16000. When packet X500 is stored in Link #a 518 according to its priority, the total queue length exceeds the threshold value of queue length in state 570. Then the packet discard portion 102 selects a link from the CBS exceeded list 1021 according to the above-described method and discards a packet corresponding to the lowest queue resulting in state 580. FIG. 5 also shows Link #n 550.

Figure 6:
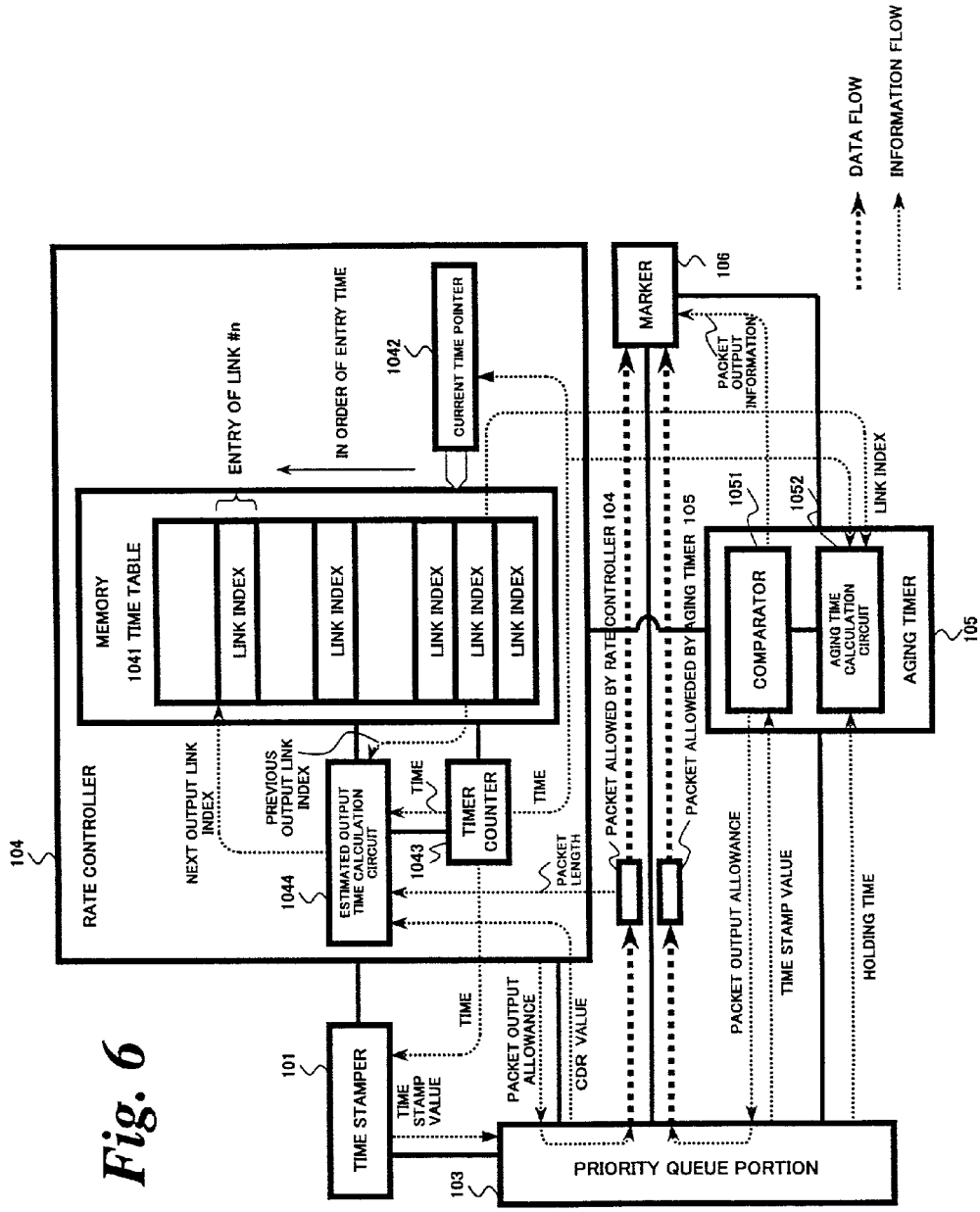
FIG. 6 is a block diagram of an exemplary configuration for a rate controller and an aging timer in accordance with methods and systems consistent with the present invention.

Referring to FIGS. 6 through 9, the operations of the rate controller 104 and the aging timer 105 will be described. FIG. 6 is a block diagram of an exemplary configuration for a rate controller 140 and an aging timer 105 in accordance with methods and systems consistent with the present invention. The rate controller 104 has a timetable 1041 that is composed on a memory and used cyclically. In this timetable 1041, a consecutive entry is provided for each unit time. A time counter 1043 performs a count-up every time when a preset unit of time passes and supplies a current time to the time stamper 101, a current time pointer 1042, an aging time calculation line 1052 and an estimated output time calculation line 1044. The current time pointer 1042 moves successively on the entry column on the time table 1041 based on the current time supplied and thus, elapsed time is determined.

When the estimated output time calculation line 1044 calculates a next estimated packet output time as a relative position from a current time based on a packet length of the read packet and a guaranteed bandwidth CDR value that is set in a link, the link index of that packet is stored in the applicable address entry. Further, if there is a link index scheduled to meet the estimated output time in an indicated entry when the current time pointer 1042 moves, a next packet may be output from the applicable queue and the priority queue portion 103 passes that packet to marker 106.

Figure 7:
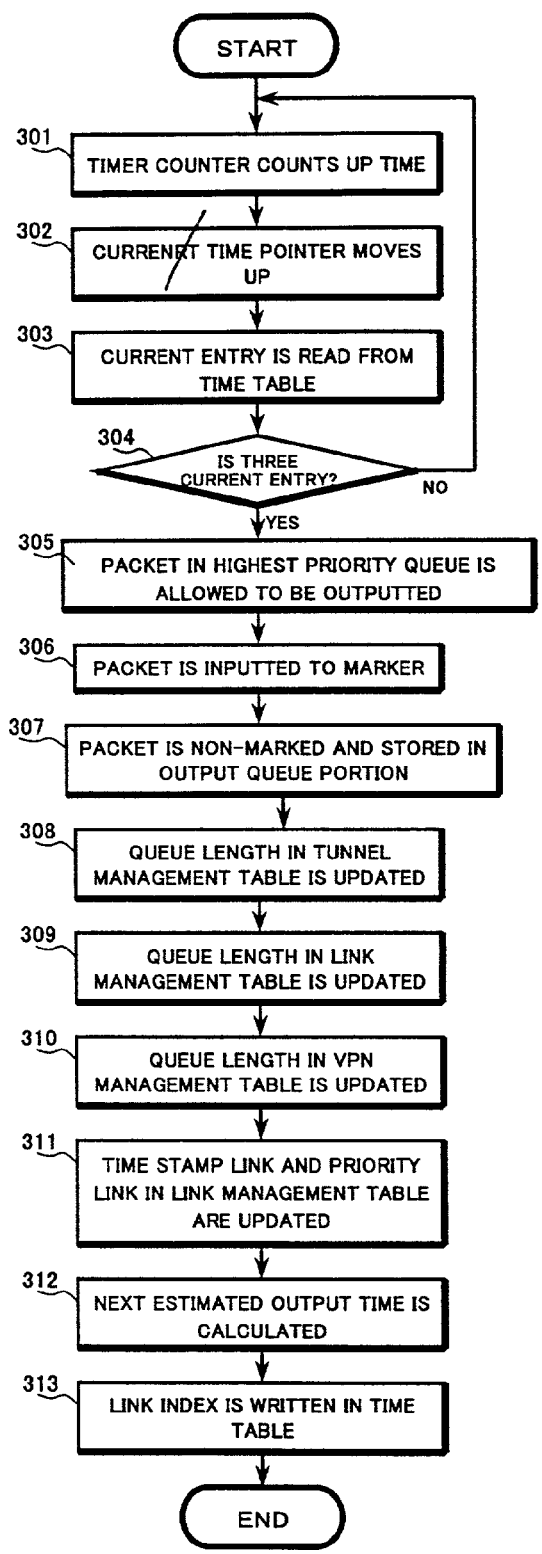
FIG. 7 is a flowchart of an exemplary technique for reading guaranteed traffic by a rate controller in accordance with methods and systems consistent with the present invention.

FIG. 7 is a flowchart of an exemplary technique for reading guaranteed traffic by a rate controller 104 in accordance with methods and systems consistent with the present invention. A timer counter 1043, shown in FIG. 6, counts up a reference time of the rate controller 104 (step 301). The current time pointer 1042 detects the timer counter and advances its own pointer value. That is, the current time pointer 1042 rises along the time table 1041 (step 302). When there a link index is entered at an address shown by the current time pointer 1042 on the time table 1041, that link index is read out (step 303). Otherwise, returning to step 301, the process repeats (step 304).

Then, the queue having the highest relay priority at the current time when managed on the link management table 1031 in the applicable priority queue portion 103 is selected and the packet is approved for output (step 305). The packet is read from the priority queue and transferred to the marker 106 at the latter stage (step 306). Then the packet approved for output by the rate controller 104 is not assigned with a mark in the marker 106, passes through the dropper 107 unchanged, and is stored in the latter stage output queue portion 108 (step 307). Then the length of a queue in tunnel management table 1081, which is a management table of each output logical line, is updated (step 308).

Regarding the packet output from the priority queue portion 103, the length of the packet is deducted from the queue length of the link management table 1031 (step 309). The length of the output packet is also deducted from the queue length of the VPN management table 1032 (step 310). Then the packet is removed from the link based on the priority and the time series of the link table structure 10311, and the priority link and the time series link are updated (step 311).

Here, the next estimated output time is calculated according to the following equation based on the contracted bandwidth CDR with a user set for each link and the last time output packet length (step 312). Then the applicable link index is written into the timetable (step 313).

Estimated output time [sec]=Packet length [Byte]×(8 bits/Byte/*CDR* value bits/sec)

The aging timer 105 comprises a comparator 1051 and an aging time calculation line 1052. The aging time calculation line 1052 calculates a threshold value for packet arrival time from current time and a approved stay time for each queue that is set for each link by the timer counter. The comparator 1051 judges whether the packet output is approved or not by comparing the threshold value for this packet arrival time with a packet time stamp value.

Figure 8:
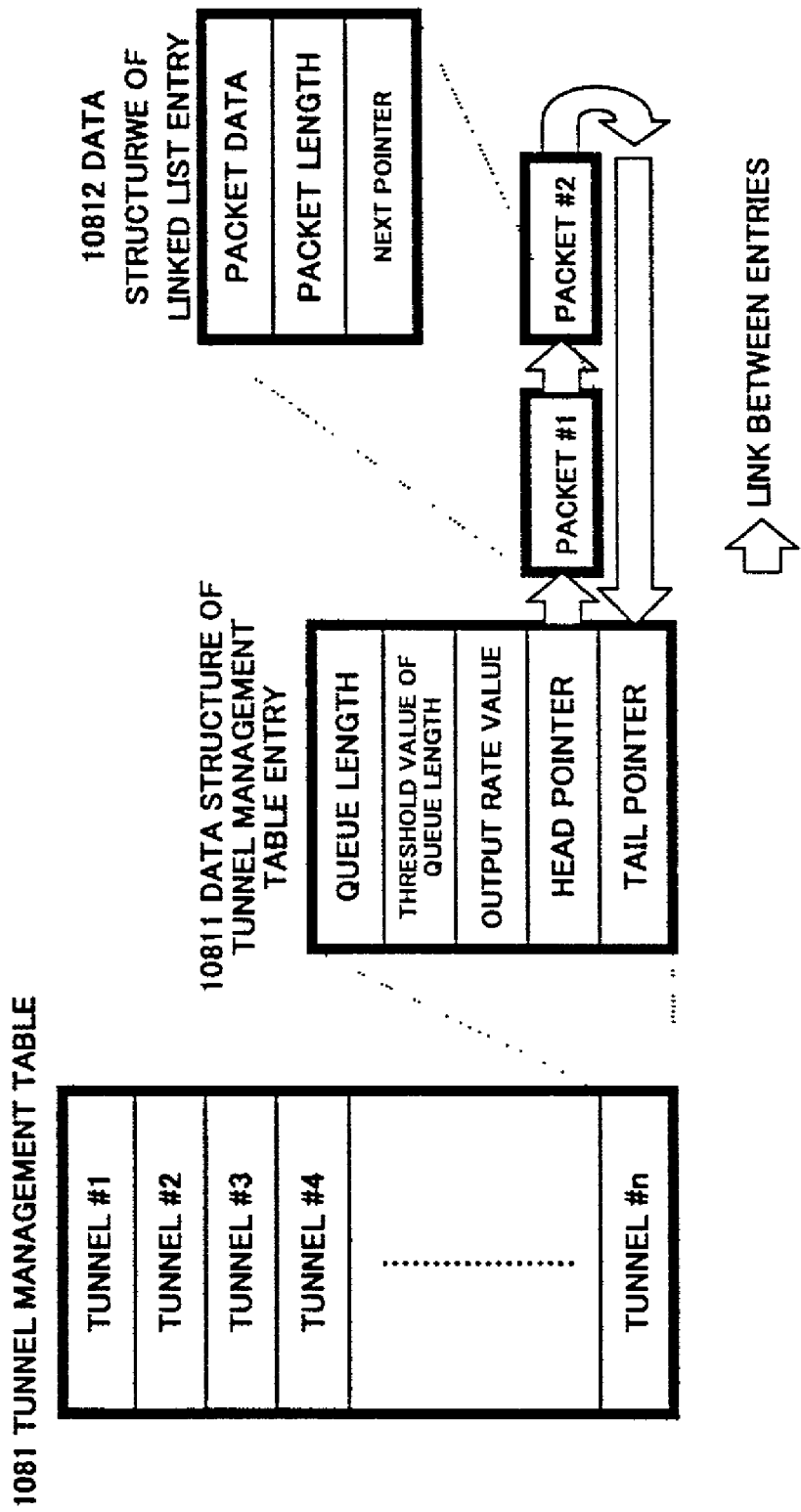
FIG. 8 is a diagram of a relationship between an exemplary tunnel management table, an exemplary tunnel management table structure, and an exemplary entry in accordance with methods and systems consistent with the present invention.

FIG. 8 is a diagram of a relationship between an exemplary tunnel management table 1081, an exemplary tunnel management table structure 10811, and an exemplary entry 10812 in accordance with methods and systems consistent with the present invention. Tunnel indexes of packets approved for output are stored sequentially in the tunnel management table 1081. The tunnel management table structure 10811 has fields for queue length for managing queue lengths of each tunnel, a threshold value of queue length that may also be used as the discard threshold value in the dropper 107, output rate values for controlling the output bandwidth of the logical line in the shaper 109 and a tunnel link pointer. The entry 10812 may contain packet data, or it may contain pointer information to a buffer wherein the packet data is stored.

Figure 9:
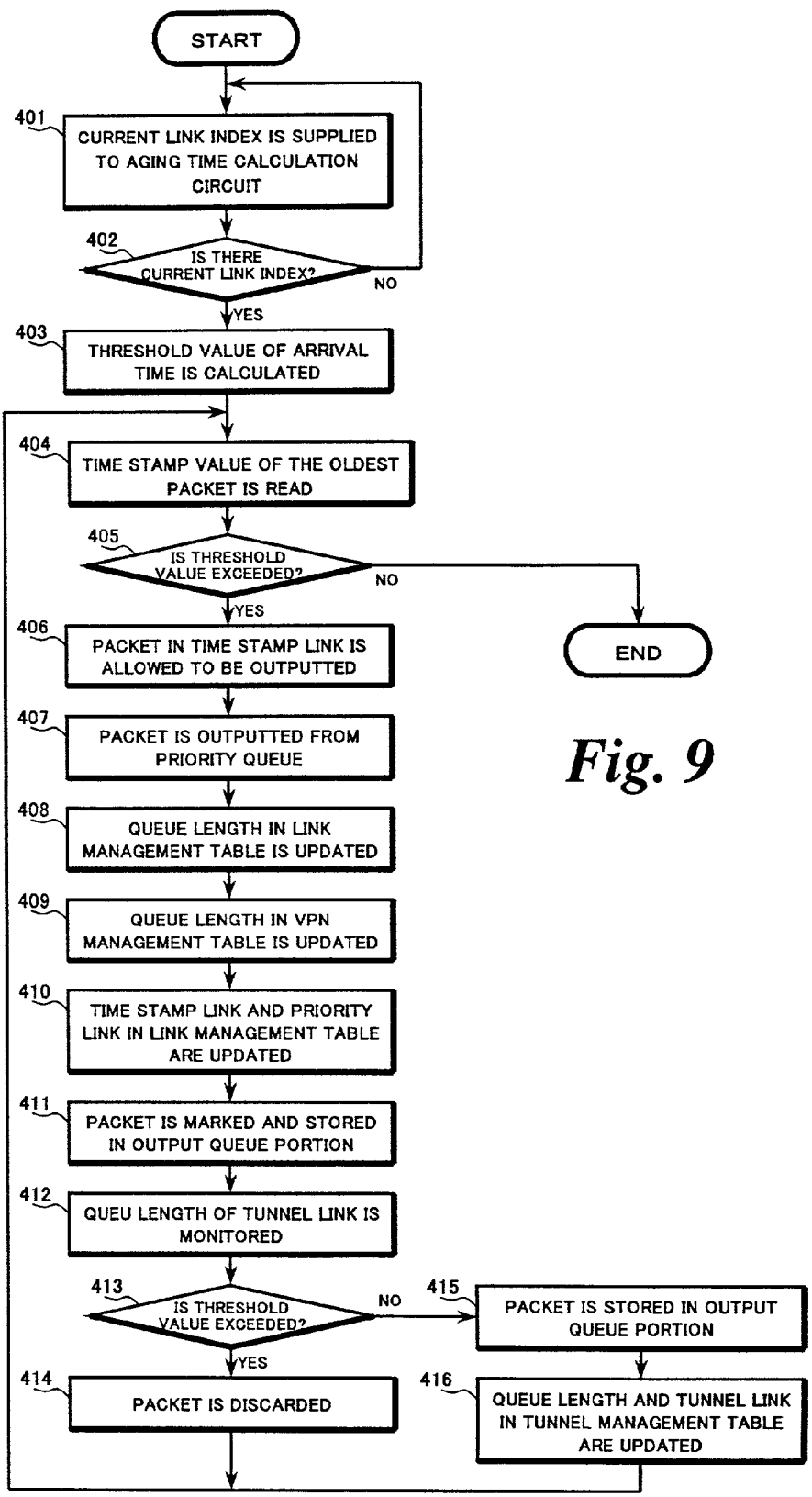
FIG. 9 is a flowchart of an exemplary technique for reading best effort traffic by an aging timer in accordance with methods and systems consistent with the present invention.

FIG. 9 is a flowchart of an exemplary technique for reading best effort traffic by an aging timer 105 in accordance with methods and systems consistent with the present invention. A link index entered in an address shown by the current time pointer 1042 is read out of the time table 1041 and supplied to the aging time calculation line 1052 (step 401). When there is no link index entered, returning to step 401, the same operation is repeated (step 402). In contrast, the aging time calculation line 1052 obtains an approved stay time value from the link management table 1031 and calculates back a threshold value of an arrival time, such as a burst time (step 403). The comparator 1051 reads a time stamp value for the oldest packet from the time stamp link (step 404) and the aging time calculation line 1052 compares this time stamp value with the threshold value for arrival time (step 405).

If the time stamp value is smaller than the threshold value, an approval is given to output older packets in the time stamp link of the link management table 1031 from the priority queue (step 406). Then, the packets are output from the priority queue (step 407), and the queue length of the link management table is updated (step 408). Then the queue length of the VPN management table is updated (step 409). Further, list entries 10312 for the packets are also removed from each priority list in the link table structure 10311, shown in FIG. 4, and the time series linked list in the link management table 1031, shown in FIG. 3. The time stamp link and priority of the link management table are updated (step 410). A packet that was outputted from the priority queue is applied with a preferential discard marking by the marker 106 and stored in the output queue (step 411).

The output queue portion 108 has the link management table 1081 for each logical line, such as a tunnel, and monitors the queue length of stay for packets (step 412). When a length of an output queue exceeds a threshold value, it is judged that the output port is congested (step 413), and the dropper 107 may discard a packet with the preferential discard marking (step 414). When the queue length does not exceed a threshold value, then the packet is stored in the output queue (step 415) unchanged. The queue length of the tunnel management table 1081 and the tunnel link are updated (step 416). When the processes in steps 414 and 416 are completed, the operation is returned to step 404 and the process is repeated. Finally, when a packet within the range of the aging time threshold value appears, the packet is not output from the priority queue portion 103 and the packet read process is completed.

Figure 10:
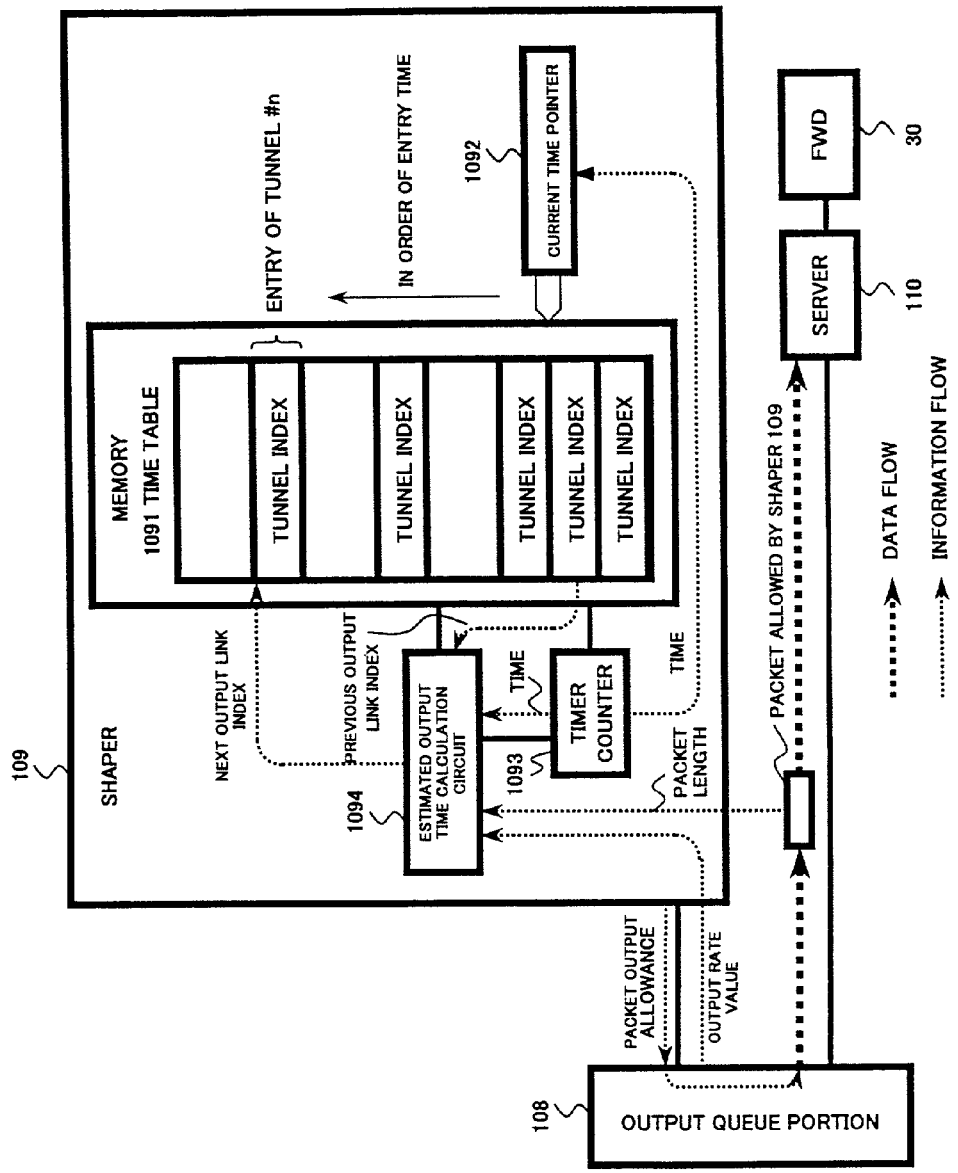
FIG. 10 is a block diagram of an exemplary configuration for a shaper in accordance with methods and systems consistent with the present invention.

The operation of the shaper 109 will be described with reference to FIGS. 10 and 11. FIG. 10 is a block diagram of an exemplary configuration for a shaper 109 in accordance with methods and systems consistent with the present invention. The shaper 109 has a timetable 1091 constructed within a memory using a circular queue structure. A consecutive entry is provided in the time table 1091 for each unit time. A timer counter 1093 executes the count-up for every prescribed unit time and supplies a current time to a current time pointer 1092 and an estimated output time calculation line 1094. The current time pointer 1092 moves on the entry chain on the time table 1091 based on the supplied current time to express an elapsed time.

The estimated output time calculation line 1094 calculates a next estimated packet output time as a relative position from the current time based on the read packet length and an output rate value set for each tunnel. Then a link index for that packet is stored in the applicable address entry. If there is a link index meeting an estimated output time on an indicating entry when the current time pointer 1092 moves, it becomes possible to output a next packet from the applicable queue and the output queue portion 108 transfers the packet to the server 110.

Figure 11:
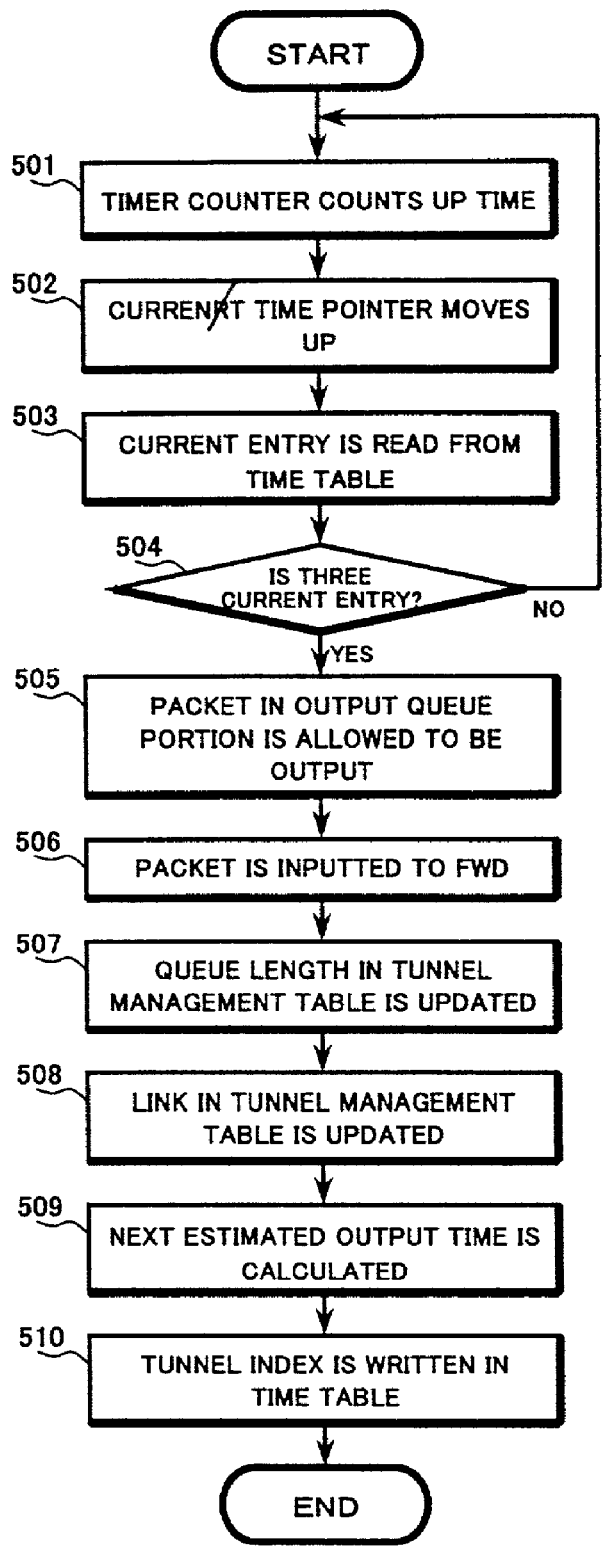
FIG. 11 is a flowchart of an exemplary technique for reading a packet from an output queue portion by a shaper in accordance with methods and systems consistent with the present invention.

FIG. 11 is a flowchart of an exemplary technique for reading a packet from an output queue portion 108 by the shaper 109 in accordance with methods and systems consistent with the present invention. A timer counter 1093 of the shaper 109 counts to measure the passage of time (step 501). A current time pointer 1092 detects the counted time and advances own pointer value. That is, the current time pointer 1092 itself moves along the time table 1091 (step 502). When there is a tunnel index entry on the timetable 1091 at the address shown by the current time pointer 1092, the applicable tunnel index is read (step 503). If not, returning to step 501, the operation repeats (step 504).

Then, the oldest packet stored and managed on the tunnel management table 1081 at the current time is selected in the applicable tunnel in the applicable output queue and an approval to output that packet is given (step 505). The packet is read from the output queue and transferred to FWD 30 through the server 110 at the latter stage (step 506). When the output of the packet from the output queue portion 108 is completed, the length of the output packet is deducted from the queue length of the tunnel management table 1081 (step 507). Further, the output packet is removed from the time series link of the tunnel table structure 10811 and the time series link is also updated (step 508).

Here, based on the logical line bandwidth output rate set for each tunnel and the last output packet length, a next estimated output time is calculated according to the following equation (step 509):

Estimated output time[s]=Packet length [Byte]×(8 [bit/Byte]/output rate value [bit/s])

Thereafter, an applicable tunnel index is written on the timetable 1091 (step 510). The packet that was outputted to the FWD 30 is converted to a desired format as necessary and sent out through the output port. Further, it is also possible to write a value equivalent to a priority discard mark to actual output packet data by the FWD 30 for the packet with the priority discard mark given by the marker 106 in the applicable field in relay unit 1.

A guaranteed bandwidth is contracted and the setting is made in a link unit which is a packet flow bundle, the output from the priority queue is treated as a guaranteed traffic by restricting the output from the priority queue according to the contracted bandwidth of the link, and packets received in excess of the contracted bandwidth are held in the priority queue. Because the system does not allocate guaranteed traffic and best-effort traffic for every priority, even when packets are received in excess of the contracted bandwidth, packets of relatively high relay priority are always output.

Figure 12:
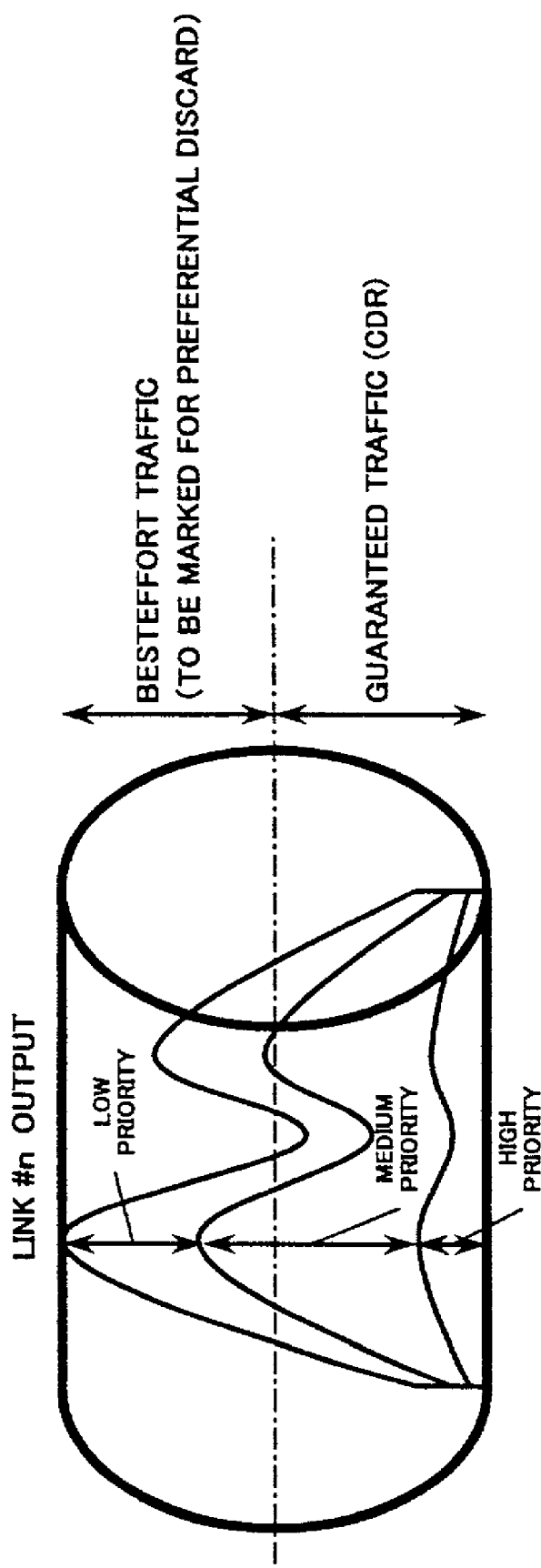
FIG. 12 is a diagram of an exemplary technique for a guarantee of minimum bandwidth based on relay priority by a relay unit in accordance with methods and systems consistent with the present invention.

The packets held in the priority queue are handled as best-effort traffic in excess of the contracted bandwidth at the point of time when elapsing an aging time set as a definite stay time and output after applying the preferential discard marking. Unless the packets exceed the contracted bandwidth the packets are not marked with the preferential discard marking, even if the relay priority is low. In contrast, when the packets exceed the contracted bandwidth the packets are treated as best-effort traffic and the preferential discard marking is applied, even if the packet relay priority is high. Further, as bandwidth is allocated to a specific priority queue and packets held in the priority queue are output as best-effort traffic, the sequence is not reversed in the same flow. Thus, it becomes possible to simultaneously perform the minimum bandwidth guarantee and the priority control. FIG. 12 is a diagram of an exemplary technique for a guarantee of minimum bandwidth based on relay priority by a relay unit in accordance with methods and systems consistent with the present invention. For example, packet flows with the priority of "High", "Medium" or "Low" are classified by the priority queue, and output packets are divided into the guaranteed traffic within the contracted bandwidth and the best-effort traffic for preferential discard marking for those packets exceeds the contracted bandwidth.

Further, even when packet receiving buffers are insufficient, it is possible to prevent discard of high priority packets by the tail drop and improve accuracy of the bandwidth guarantee based on relay priority by securing unused receiving buffers in required sizes by discarding packets having lower priority than those of receiving packets from a link receiving packets in excess of a buffer size equivalent to the receiving burst size preset in the link belonging to the applicable VPN 16000.

However, when the packet scheduling process of the bandwidth control portion 10 is executed without the movement of packet data, the receiving buffers may be insufficient.

Figure 13:
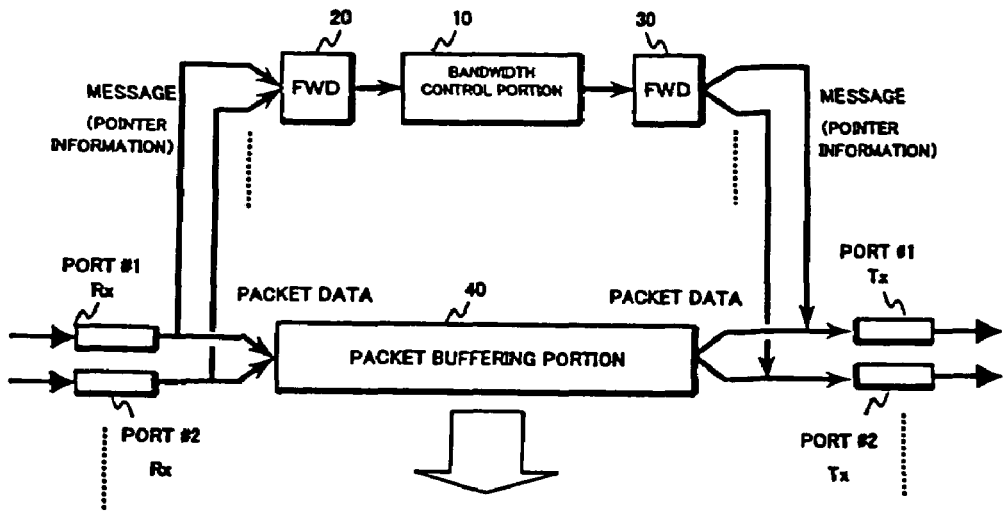
FIG. 13 is a diagram of an exemplary buffer allocation technique for a relay unit in accordance with methods and systems consistent with the present invention.
Figure 13:
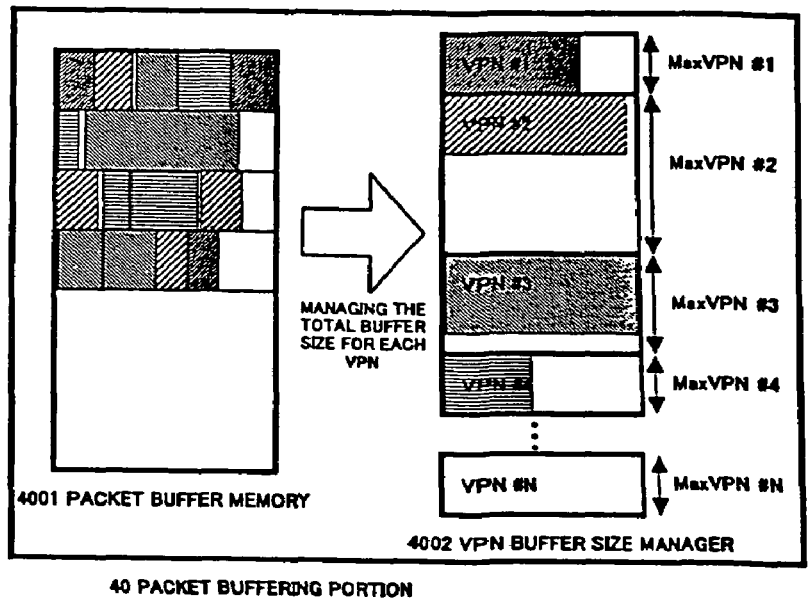

FIG. 13 is a diagram of an exemplary buffer allocation technique for a relay unit 1 in accordance with methods and systems consistent with the present invention. Packet data may be placed in a packet buffer area other than the bandwidth control portion 10. A series of scheduling processes for dequeueing packets from the priority queue portion 103 and enqueueing packets in the output queue portion 108 are completed by removing the packet pointer, that is, the top address of packet data stored in the packet buffer memory from the entry on the VPN management table 1032 and the link management table 1031 and entering the packet pointer in the tunnel management table 1081. Thus, before and after the packet scheduling process, the packet data on the packet buffer memory are not moved and until they are output from the bandwidth control portion, the packet data remains in the packet buffer memory.

Packet data are actually erased from the packet buffer memory after packets are transferred to FWD 30 after scheduling by the shaper 109, and removed from the entry of the tunnel management table 1801 or after the packets are discarded by the dropper 107. Accordingly, when several VPN 16000 input traffic rates exceed the contracted guaranteed bandwidth and outputs to the tunnels are congested, a time lag is generated until the output queue length exceeds a threshold value and the packet data are kept in the packet buffer portion.

Even if a mechanism acted to secure an unused receiving buffer when packets were input into the bandwidth control portion and prevent the tail drop, when a packet data substance does not move before and after the packet scheduling process as in this method, a specific VPN may occupy the receiving resource. This may be avoided when the maximum area size usable for each VPN (40–50) is pre-allocated to the packet buffer memory 4001 for storing a packet data substance as max VPN buffer size and a stationary resource is secured for each VPN (40–50). FIG. 13 also shows VPN buffer size manager 4002 for managing the total buffer size for each VPN.

The traffic from the priority queue is stored in the output queue in the mixed state of guaranteed traffic and best-effort traffic. The output rate control is made by the shaping from this output queue conforming to the output port or a bandwidth of a logical line. In this output queue, a discard threshold value is provided and when this threshold value is exceeded, it is judged that the output port is congested and best-effort traffic is discarded. When an input traffic rate is lower than this output port or the bandwidth of the logical line, almost no packet is kept in this output queue or the number of packets is definite.

However, when a user is able to use a bandwidth in excess of the contracted bandwidth and the traffic rate exceeds the bandwidth of the output port, the best-effort traffic marked with the preferential discard marking is discarded preferentially, the guaranteed traffic bandwidth is secured, and the minimum bandwidth can be guaranteed even when the output port is congested.

Figure 14:
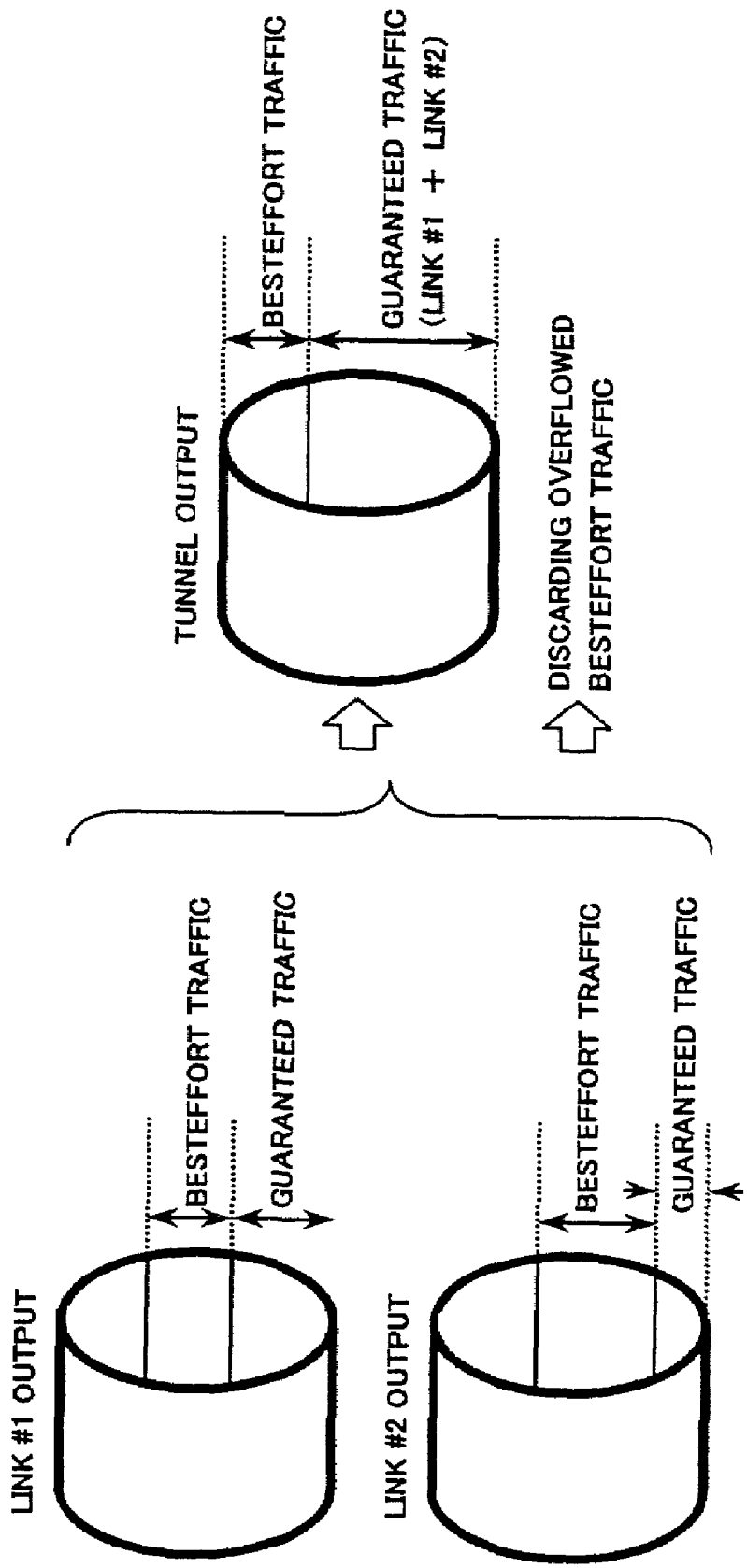
FIG. 14 is a diagram of an exemplary technique for separation and combination of guaranteed traffic and best effort traffic in accordance with methods and systems consistent with the present invention.

FIG. 14 is a diagram of an exemplary technique for separation and combination of guaranteed traffic and best effort traffic in accordance with methods and systems consistent with the present invention. A plurality of traffic flows may be separated into guaranteed traffic and best effort traffic at each link output. The guaranteed traffic is merged and tunnel output by the relay unit 1 and part of the best effort traffic is discarded. However, when the traffic using bandwidth in the current guaranteed bandwidth in any link is less than the guaranteed bandwidth that is preset in this link, the best effort traffic in the same link or the same tunnel may be output.

Figure 15:
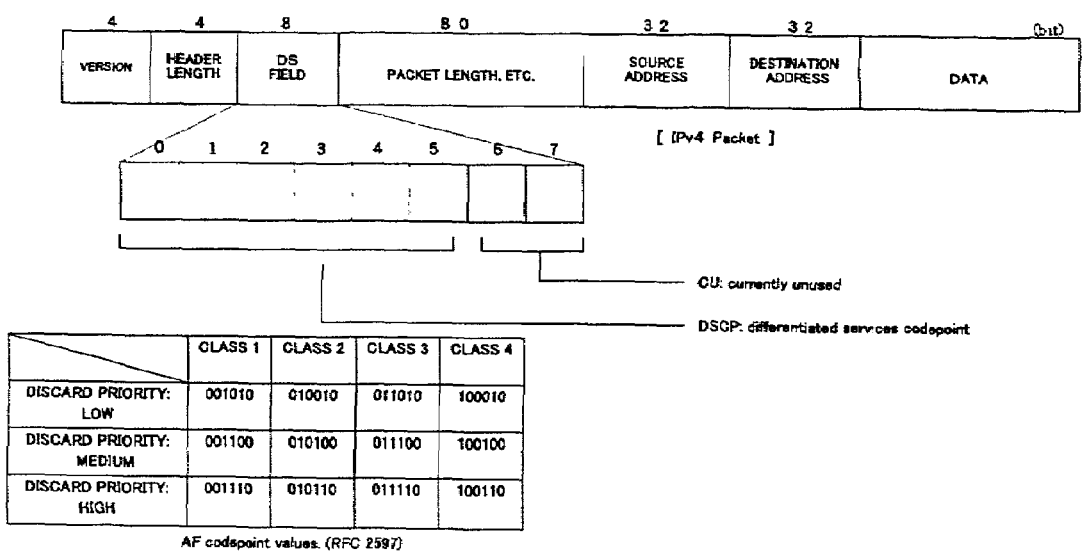
FIG. 15 is a diagram of an exemplary discard marking technique for a relay unit in accordance with methods and systems consistent with the present invention.
Figure 16:
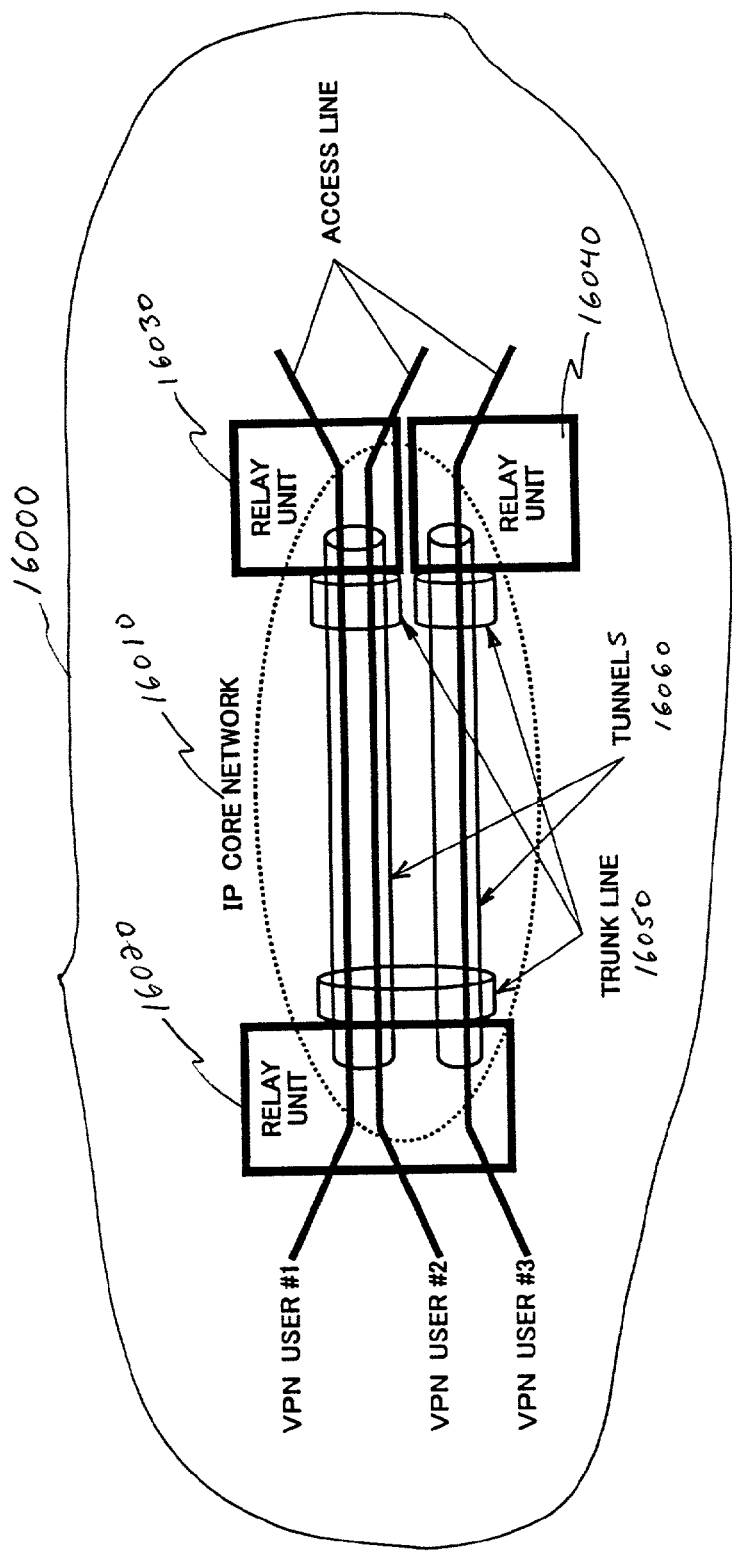
FIG. 16 shows a conventional virtual private network.
Figure 17:
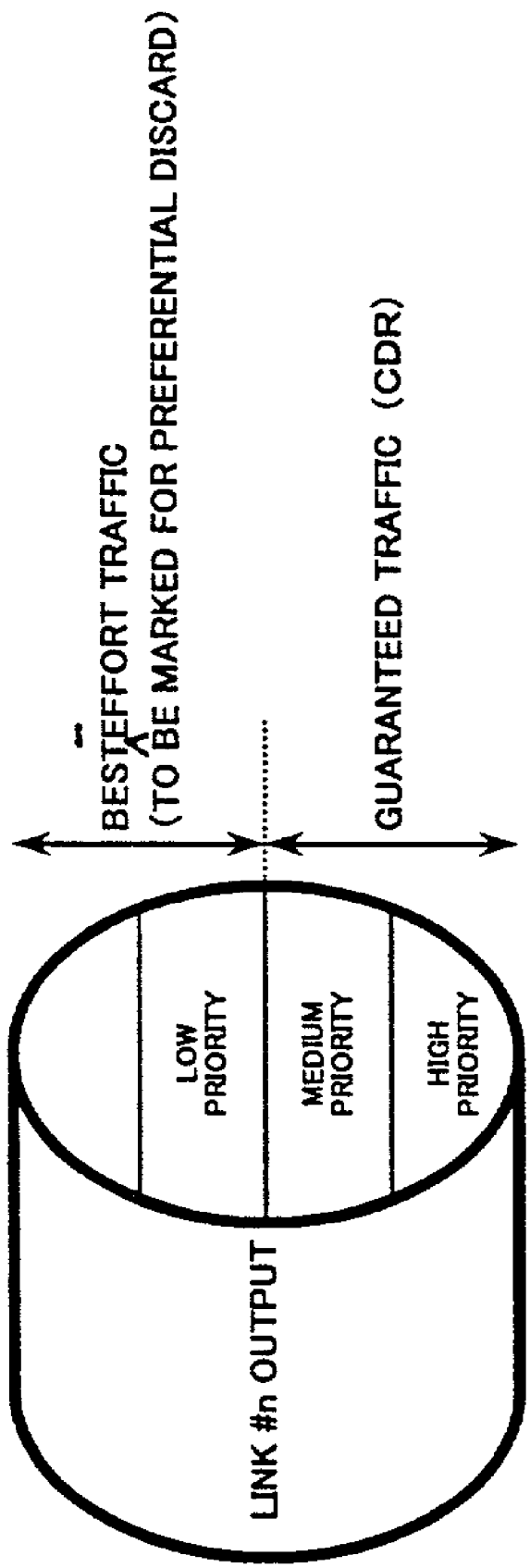
FIG. 17 shows a conventional guarantee of bandwidth system based on relay priority.

FIG. 15 is a diagram of an exemplary discard marking technique for a relay unit 1 in accordance with methods and systems consistent with the present invention. This method may be applied in the relay unit 1 or in the IP core network 16010. An embodiment for assured forwarding (RFC2597) for a differentiated service quality-of-service is illustrated using Internet technology. In the assured forwarding service, four independent classes and three different levels of discard priority are allocated according to the services and the class, and discard priority are designated by assigning a codepoint value to a differentiated services codepoint (DSCP) bit of an area called the differentiated services field of the IP packet format. The relay unit in a network performs the operation per hop behavior based on the class and discard priority according to the codepoint value. Even when the network is congested, bandwidth guaranteed service of the network is possible by discarding packets based on discard priority, if the bandwidth of the guaranteed bandwidth is secured in the end-to-end communication.

For example, when an IP packet having a codepoint value of 001010 (Class 1, low discard priority) is input into the relay unit 1 for relay processing, a discard mark is assigned to it by the relay unit 1. Then, when the packet is output to a next relay unit, this discard mark may be incorporated in codepoint value 001100 (Class 1, medium discard priority) or the codepoint value may be altered to the value 001110 (Class 1, high discard priority). Thus, a packet having a codepoint value of 001010 may be treated as guaranteed traffic, and a packet having a codepoint value of 001100 or 001110 may be treated as best-effort traffic in the IP core network.

Thus, in addition to the use for preferential discard at the time when the relay unit 1 is congested, the discard mark may be used as a priority discard mark in the IP core network by assigning it to a packet at the exit of the relay unit 1, such as in FWD 30.

As described above in detail, according to the present invention, the guaranteed bandwidth can be retained commonly for traffic in mixed relay priorities and therefore, a definite bandwidth is always secured irrespective of change in traffic volume for each priority and the guaranteed bandwidth can be effectively used. Further, when the input traffic exceeds the guaranteed bandwidth, packets having high relay priority are always transferred with guaranteed traffic. Therefore, the user may transfer critical traffic without requiring that the relay unit 1 be complicated or large in size. Furthermore, in the case of the bandwidth guarantee based on relay priority, the sequence of the packet flow is not reversed.

What is claimed is:

1. An inter-network relay unit comprising:
a first queue configured to store received packets according to their respective priorities;
a rate controller configured to generate timing for outputting each packet stored in the first queue at a predetermined rate;
a timer configured to measure how long each packet is stored in the first queue;
a marker configured to identify packets stored in the first queue longer than a predetermined time limit; and
a first server configured to output packets according to the timing as traffic within a predetermined bandwidth corresponding to the predetermined rate, and to output identified packets as traffic outside the predetermined bandwidth to be transmitted according to respective priorities of the identified packets.

2. The inter-network relay unit of claim 1, wherein:
the first queue includes a plurality of priority queues configured to store the received packets according to their respective priorities; and
the first server outputs packets from the plurality of priority queues according to the respective priorities of the packets.

3. The inter-network relay unit of claim 1, further comprising:
a second queue configured to store packets outputted from the first server; and
a dropper configured to discard the identified packets stored in the second queue when the inter-network relay unit is congested.

4. The inter-network relay unit of claim 3, further comprising:
a shaper configured to generate timing for outputting each packet stored in the second queue at a predetermined rate for each line on a network; and
a second server configured to output packets from the second queue according to the timing.

5. The inter-network relay unit of claim 1, further comprising:
means for assigning a discard priority to each identified packet, according to which the identified packets are discarded when a network is congested.

6. An inter-network relay unit, comprising:
a plurality of queues configured to store received packets according to their respective priorities; each queue having a preset first threshold value of queue length, a preset second threshold value of queue length, and a total length;
means for managing queues with lengths in excess of their respective first threshold values; and
means for discarding one or more of the packets stored in the managed queues according to excess length when the total length of the managed queue used exceeds the second threshold value,
wherein:
the plurality of queues include a plurality of priority queues configured to store received packets according to their respective priorities; and
the discarding means discards one or more of the packets stored in the managed queues according to excess length and in reverse order of the respective priorities of the packets in the managed queues.

7. An inter-network relay unit comprising:
a plurality of queues configured to store received packets according to their respective logical lines via which the packets are received; wherein a plurality of queues are coupled to each logical line and each queue has a preset first threshold value of queue length, a preset second threshold value of queue length, and a total length, and the received packets have respective priorities;
means for managing queues with lengths in excess of their respective first threshold values; and
means for discarding one or more of the packets stored in the managed queues and to be transferred via a logical line where the first threshold value is exceeded according to excess length, when the total used length exceeds the second threshold value.
wherein:
the plurality of queues include a plurality of priority queues configured to store received packets according to their respective priorities; and
the discarding means discards one or more of the packets stored in the managed queues according to excess length and in reverse order of the respective priorities of the packets in the managed queues.

8. An inter-network relay unit comprising:
a plurality of queues configured to store received packets according to their respective logical lines via which the packets are transferred, wherein a plurality of queues are coupled to each logical line, the logical lines have allocated bandwidths and the packets have respective priorities;
a rate controller configured to generate timing for outputting packets stored in each queue at a predetermined rate for each logical line;
a timer configured to measure how long each packet is stored in the queue; a marker configured to identify packets stored in the queue longer than a predetermined time limit;
a plurality of first servers, each configured to output packets from each queue, according to the timing as traffic within a predetermined bandwidth corresponding to the predetermined rate, and to output identified packets as traffic outside the predetermined bandwidth to be transmitted according to respective priorities of the identified packets; and
a second server configured to output packets identified as traffic outside the predetermined bandwidth by the first servers, using unused bandwidth from the predetermined bandwidth on any of the logical lines, when the bandwidth currently used for the logical line is less than the bandwidth allocated for the logical line.

9. An inter-network relay unit comprising:
a plurality of first queues, wherein a plurality of queues are coupled to each logical line, configured to store identification information on received packets according to their respective logical lines via which the packets are received, wherein the logical lines are grouped and the received packets have respective priorities;
a memory configured to store contents of the packets, in which each group has a preset memory size;
a rate controller configured to generate timing for outputting packets, wherein first information is stored in the first queue at a predetermined rate for each logical line;
a timer configured to measure how long first information for each packet is stored in the plurality of first queues;
a marker configured to identify packets having first information stored in the plurality of first queues longer than a predetermined time limit; and
a plurality of first servers each configured to output from each first queue first information for each packet according to the timing and the identification as traffic within a predetermined bandwidth corresponding to the predetermined rate, and to output first information for identified packets as traffic outside the predetermined bandwidth to be transmitted according to respective priorities of the identified packets.

10. A transfer scheduling method in an inter-network relay unit, comprising:

identifying priorities of received packets;

storing the received packets in a plurality of queues according to their respective identified priorities;

generating timing for outputting each packet stored in the queue at a predetermined rate;

measuring how long each packet is stored in the queue;

identifying packets stored in the queue longer than a predetermined time limit; and outputting packets from the queue according to the timing as traffic within a predetermined bandwidth corresponding to the predetermined rate, and outputting identified packets as traffic outside the predetermined bandwidth to be transmitted according to respective priorities of the identified packets.

11. A transfer scheduling method in an inter-network relay unit, comprising:

outputting a first packet from a queue;

generating entries in a time table at a predetermined interval;

calculating a position in the time table corresponding to when a second packet is outputted, the second packet which is outputted after the first packet, as a relative position from a position corresponding to when the first packet is outputted based on the length of the first packet and on a predetermined bandwidth value predetermined for each queue;

registering the second packet in the entry at the calculated position; determining whether the second packet is registered or not at the predetermined interval; and allowing the second packet to be outputted when the second packet is determined to be registered.

12. A transfer scheduling method in an inter-network relay unit, comprising:

storing a packet in a queue;

registering an arrival time of the packet with an entry in a database, the entry being linked another entry registered just before the registering;

calculating a threshold value of arrival time of each stored packet based on a current time and a preset upper limit of being stored in the queue;

comparing each registered arrival time with the threshold value at a predetermined interval; and recognizing every packet linked before a packet, of which arrival time is later than the threshold value, to be over the upper limit.

* * * * *